(12) United States Patent
Galinsky

(10) Patent No.: US 10,815,744 B2
(45) Date of Patent: Oct. 27, 2020

(54) CORE DRILLING METHODS AND DEVICES

(71) Applicant: Mauerspecht GmbH, Coswig (DE)

(72) Inventor: Volker Galinsky, Coswig (DE)

(73) Assignee: Mauerspecht GmbH, Coswig (DE)

( * ) Notice: Subject to any disclaimer, the term of this patent is extended or adjusted under 35 U.S.C. 154(b) by 111 days.

(21) Appl. No.: 16/058,041

(22) Filed: Aug. 8, 2018

(65) Prior Publication Data

US 2019/0048674 A1 Feb. 14, 2019

(30) Foreign Application Priority Data

Aug. 8, 2017 (DE) .......................... 10 2017 117 963

(51) Int. Cl.
*E21B 25/10* (2006.01)
*E21B 10/04* (2006.01)
(Continued)

(52) U.S. Cl.
CPC .......... *E21B 25/10* (2013.01); *B23B 51/0413* (2013.01); *B26D 7/1845* (2013.01); *B28D 1/041* (2013.01); *E21B 10/02* (2013.01); *E21B 10/04* (2013.01); *E21B 41/0078* (2013.01); *B08B 9/045* (2013.01); *B24C 1/04* (2013.01);
(Continued)

(58) Field of Classification Search
CPC .......... E21B 10/02; E21B 25/10; E21B 10/04; E21B 10/605; B23B 51/0413; B28D 1/041
See application file for complete search history.

(56) References Cited

U.S. PATENT DOCUMENTS 1,512,140 A * 10/1924 Schaub ..................... E21B 7/16
175/40
2,034,073 A * 3/1936 Wright .................... E21B 10/04
175/333
(Continued)

FOREIGN PATENT DOCUMENTS

CN 1060907121 A 6/2017
EP 2295709 A1 3/2011
(Continued)

OTHER PUBLICATIONS

English-language machine translation of European Patent Application Publication No. EP 3 305 425 A1, Apr. 11, 2018.
(Continued)

*Primary Examiner* — Cathleen R Hutchins
(74) *Attorney, Agent, or Firm* — Dascenzo Intellectual Property Law, P.C.

(57) ABSTRACT

Methods and devices for the execution of core drillings in a material by a drilling unit, which makes use of a drill bit, and such drill bits that are made up of a hollow cylindrical core barrel, which has an end plate at its rear end and abrasion elements, which serve the abrasion of material, at the front end as well as at least two high-pressure jet nozzles, which can be connected with a high-pressure source of a blasting medium. The high-pressure jet nozzles are arranged on the inner surface of the core barrel and/or its end plate and are oriented into the inside of the core barrel. As a result of a combined forward motion and rotation of the drill bit, a drilling core is formed from which an abrasion takes place by means of the blasting medium, whereby overburden is removed from the drill bit.

20 Claims, 5 Drawing Sheets

(51) Int. Cl.
*B23B 51/04* (2006.01)
*B28D 1/04* (2006.01)
*B26D 7/18* (2006.01)
*E21B 10/02* (2006.01)
*E21B 41/00* (2006.01)
*B24C 1/04* (2006.01)
*E03F 9/00* (2006.01)
*B08B 9/045* (2006.01)
*B26F 1/26* (2006.01)
*B26F 3/00* (2006.01)

(52) U.S. Cl.
CPC ............... *B26F 1/26* (2013.01); *B26F 3/004* (2013.01); *E03F 9/002* (2013.01)

(56) References Cited

U.S. PATENT DOCUMENTS

| | | | | |
|---|---|---|---|---|
| 2,084,686 | A | | 6/1937 | Howard |
| 2,724,575 | A | * | 11/1955 | Deily ...................... E21B 10/02 175/54 |
| 2,975,849 | A | * | 3/1961 | Stuart ...................... E21B 10/04 175/333 |
| 3,112,800 | A | * | 12/1963 | Bobo ...................... E21B 10/04 175/67 |
| 5,016,718 | A | * | 5/1991 | Tandberg ................ E21B 10/04 175/333 |
| 5,439,067 | A | * | 8/1995 | Huffstutler .............. E21B 10/18 175/339 |

FOREIGN PATENT DOCUMENTS

| | | |
|---|---|---|
| EP | 3 305 425 A1 | 4/2018 |
| GB | 686778 A | 1/1953 |
| JP | H10-44133 A | 2/1998 |
| JP | 2000-291370 A | 10/2000 |

OTHER PUBLICATIONS

English-language machine translation of Chinese Patent Application Publication No. CN 106907121 A, Jun. 30, 2017.
English-language machine translation of Japanese Patent Application Publication No. JP 2000-291370 A, Oct. 17, 2000.
English-language machine translation of Japanese Patent Application Publication No. JP H10-44133 A, Feb. 17, 1998.

\* cited by examiner

CORE DRILLING METHODS AND DEVICES

RELATED APPLICATION

This application claims priority under 35 U.S.C. § 119 to German Patent Application No. 102017117963.1, which was filed on Aug. 8, 2017, and the complete disclosure of which is incorporated by reference.

FIELD

The present disclosure relates to core drilling devices and methods.

BACKGROUND

Drill bits are known as the tools of a drill, with which a ring-shaped hole is cut into solid material, for instance concrete, natural stone, brick, ceramic, or other materials, the centrally remaining drilling core is then detached from the material and is removed from the hole. For the production of a ring-shaped drilled hole, the drill bit comprises a hollow-cylindrical body referred to as a core barrel. The core barrel has cutting elements or grinding elements distributed across the surface of its front end, which, with regard to material, shape, and distribution, are suitable for the abrasion of material to the required extent and in the required way.

Subsequently, the cutting elements and the grinding elements shall generally be referred to as abrasion elements. The abrasion elements can be arranged on the circular covering surface of the core barrel and/or on a suitably long front section of the inner and/or outer surface of the core barrel. In a known manner, the rear end of the drill bit can be connected, using a suitable connector, to the tool holding fixture of an external supply unit of the drilling unit, which is used by the drill bit. The supply unit and further components of the drilling unit, which serve the running and the operating of the drilling unit, are adapted to the respective application and are not part of the drill bit itself. The connector is designed with regards to the tool holding fixture, so that the drill bit can be operated and, in particular, rotated at the desired speed. The geometry and the materials of the core barrel and of the abrasion elements of the drill bit are designed with regards to the material to be drilled into and the size as well as the depth of the hole. Known drill bits can produce drilled holes of only a few centimeters up until several 10 centimeters and more.

Wet and dry drillings are possible. For wet drillings, a flushing agent flows into the drilled hole through the core barrel and/or along the outside of the core barrel, so that the removed drilling material can be flushed away and the drill bit can be cooled.

The removal of the drilling core or sections thereof from the drilled hole can be carried out in different ways. Often, the core is broken mechanically or through its own weight into small sections, which can be removed more easily, such as by a flushing agent. With an increasing diameter of the drilling core, the breaking of the drilling core can become increasingly uncontrollable as well as difficult and more often necessary, so that the result and efficiency of the core drilling can become inadequate, or a lengthy hole milling is carried out instead of a core drilling since the drilling core cannot be dealt with. The latter is known, e.g., from duct renovations, if a duct, which can sometimes extend over several meters, needs to be shut completely.

SUMMARY

There is therefore a need for a core drilling method and drill bit, by which improved handling of the drilling core and efficient drilling are made possible. Additionally, the method and the drill bit shall be usable for drillings that are not vertical, for instance for almost horizontal drillings such as for carrying out duct renovations.

There is also a need for a method and device that can be used with different materials and for both vertical and horizontal drilling methods as well as for drilled hole sizes of up to approximately 1 meter (m) and larger.

The present disclosure relates to methods for the execution of core drillings into a material using a drill, which utilizes a core drill bit. The present disclosure also relates to drill bits, which are designed as a hollow cylindrical core barrel and which have abrasion elements at the front of the core barrel, which serve the abrasion of material and which are attached to the surface of the core barrel in an annular manner. The present disclosure further relates to devices for the removal of adherences on the inner surface of channels (ducts), which also have such a drill bit, by high-pressure blasting.

The concept of the subsequently described devices and methods executable therewith are to be described as a combined material removal, namely the mechanical abrasion with the formation of a drilling core, which is inside the drill bit, in conjunction with an abrasion of material, which in turn uses a blasting medium under high pressure in order to abrade material from the drilling core as well.

A high pressure for the blasting medium may be pressures which range from approximately 80 bar to approximately 6000 bar and therefore may lie considerably above those pressures used for wet drillings. Currently, pumps are known, which are used to achieve a fluid pressure of up to 6000 bar, but such extreme pressures can create limitations through the medium supply to the nozzles. Such extreme pressures are used, for instance, with stationary fluid blasting devices, which are used for the separation or cutting of hard materials. In regards to fluid guides, such as reinforced plastic hoses, the upper limit of the maximum of the fluid that can be directed through this flexible fluid guide is currently approximately 3000 bar. With further development, higher pressures may also be possible and may be used for the purpose of the methods and devices described in the following. The method and the devices to be used therewith are also particularly suitable for the use of a maximum pressure, so that the subsequent mention of high pressure also includes the use of a maximum pressure.

DESCRIPTION

Figure 1:
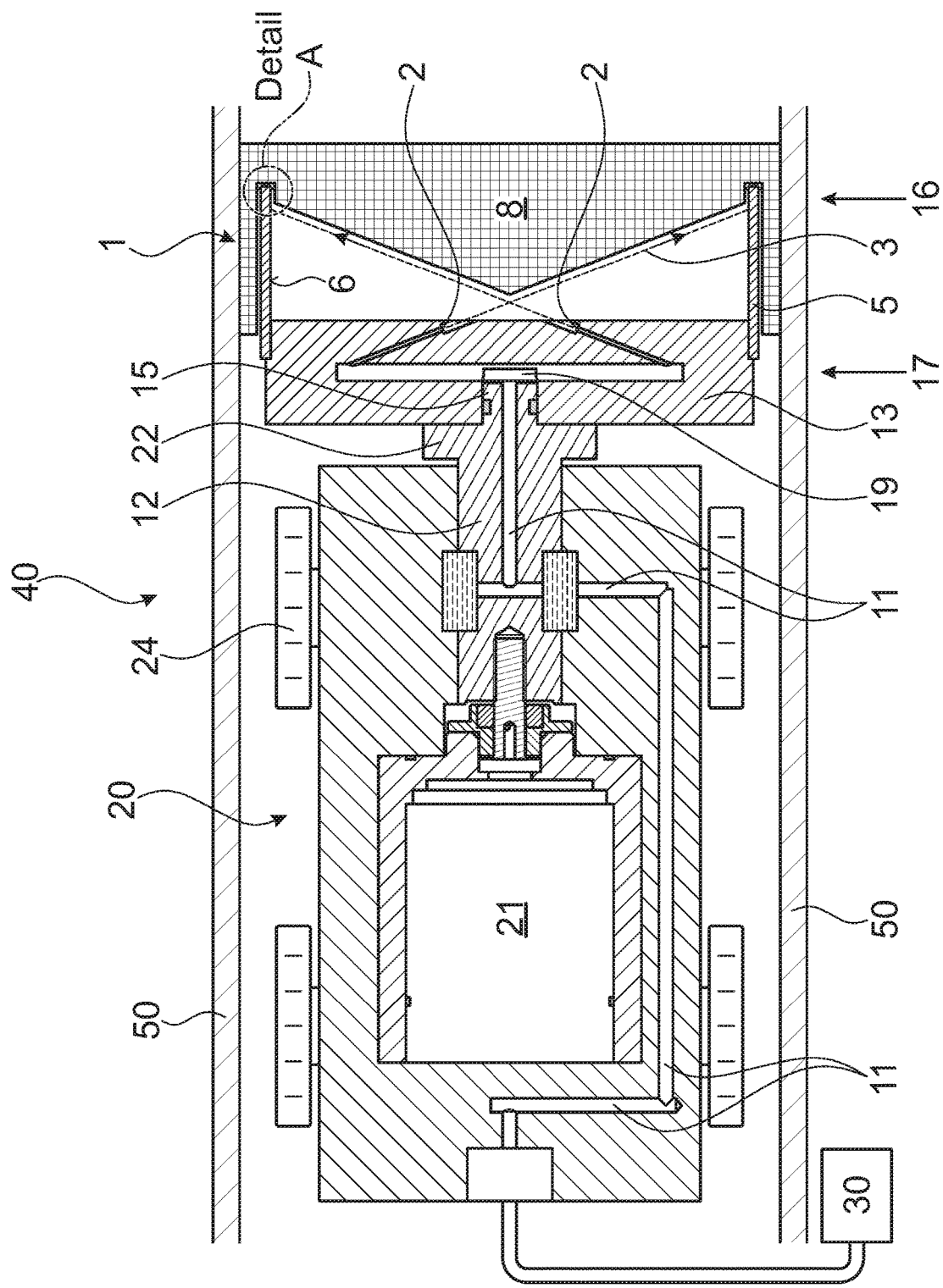
FIG. 1 is a cross-sectional view of an example drill bit with a drilling unit, using the example of a duct renovation device.

Subsequently for the realization of the concept, characteristics of the used method and device are described. For different embodiments, these may be combined in different ways by the expert, as far as he or she deems appropriate and suitable for an application.

For the execution of the method of a core drilling, a drill bit is used which is designed as a hollow cylindrical base body, subsequently referred to as a core barrel, and which has abrasion elements at the front end of the core barrel, which serves the abrasion of material. The abrasion elements may be cutting elements or grinding elements or other elements which are suitable for the abrasion of material. They are attached across the front edge of the surface of the core barrel, so that they form a ring of abrasion elements, which is positioned at the front end of the drill bit and covers the front face of the drill bit. Alternatively or additionally, abrasion elements may be arranged on a narrow front ring of the outer surface, optionally also on the inner surface.

The terms 'front' and 'rear' or rather 'front face' and 'rear face' or analogous terms refer to the direction of the mechanical abrasion of material and therefore coincide with the axis of the drilling core and drill bit.

The rear end of the drill bit, which lies opposite the front end, is made up of an end plate, which closes the drill bit at the rear and which can be designed in different ways. For instance, it may be circular or annular or shaped differently, so that it can ensure the stability of the drill bit as well as the rotation and the forwards motion of the drill bit into the emerging hole.

A suitable connector is arranged at the end plate or the core barrel, which are suitable for the production of a mechanical connection to a supply unit of the drilling unit. The connection to the supply unit is such that the drill bit can be rotated. Dependent on the realization of the drilling unit or additional components, different connectors are suitable, such as nozzles, bearings, flanges, or others.

The drill bit has at least two, optionally also more, high-pressure jet nozzles. These are connected with a suitable high pressure source through a suitable connector, which provides a blasting medium under a high pressure, if necessary also under maximum pressure, and which directs the blasting medium via the connectors to the high-pressure jet nozzles.

A nozzle is a tubular device guiding a fluid, which has a tapered cross-section towards the nozzle outlet to increase the speed of the fluid. A nozzle is referred to as a jet nozzle, which has one or more openings for the generation of a high pressure jet from a blasting medium which is under a high or maximum pressure, so that the high pressure jet follows a directed jet path.

A jet path is understood in this case as the central axis of the jet, which indicates the predominant direction of the spreading of the fluid and typically is determined through the axis of the tubular portion of the nozzle. Depending on the material to be drilled, solid particles may be added to the blasting medium to enhance the abrasive effect.

For utilization in the drill bit, such high-pressure jet nozzles are suitable, which provide the desired jet shape, for instance fan-shaped, bundled, multiple jets, or other shapes, or enable a variation of the jet shape and which are adapted to the used blasting medium as well as the used pressure.

It is apparent that the high-pressure jet nozzles are arranged in such a way that none of the high-pressure jet nozzles extend beyond the internal radius of the abrasion elements, in this case referred to as internal ring radius, i.e., they do not have a smaller distance to the axis of the core barrel than the abrasion elements. Otherwise, the high-pressure jet nozzles would collide with the drilling core during the drilling. From a construction point of view, this can be realized in different ways. The high-pressure jet nozzles may be countersunk in the inner surface of the core barrel, so that they do not protrude above the inner surface. Alternatively or additionally, the internal ring radius may be smaller than the internal radius of the core barrel, so that the jet nozzles may protrude above the inner surface of the core barrel by an amount which is smaller than the difference between the internal tube (barrel/pipe) radius and the internal ring radius.

It is apparent that the supply of the blasting medium likewise, as described with the jet nozzles, does not protrude above the internal ring radius and in the same way does not protrude above the external ring radius in order to avoid a collision with the wall of the drilling core or rather the drilled hole.

The high-pressure jet nozzles are directed towards the inside of the core barrel in order to abrade material at that point of the drilling core by dividing the drilling core into the defined sections or destroying it or by combining both variations of processing the drilling core with each other.

Through different orientations of the high-pressure jet nozzles, the location and extent of the abrasion of material may be influenced. According to one embodiment, the jet direction of the high-pressure jet nozzles may be varied in order to adapt the abrasion of material to the respective application.

In regards to the number, the position, and the orientation of the high-pressure jet nozzles, the jet shape may be taken into account besides the location and the extent of the abrasion of material. The variation of these parameters allows very different executions of the abrasion of material and the consideration of further conditions of the method to be executed. For instance, the high-pressure jet nozzles may be oriented in such a way that the blasting only blasts onto the inner surface of the core barrel. In this way, it is ensured that if the jet penetrates the material to be abraded, damage to the wall of a duct behind is excluded.

In order to remove the overburden from inside the drill bit, which may form as a result of the abrasion of material through the high-pressure blasting in the drill bit, the drill bit may have outflows, whereby these are coordinated with the inlets of the blasting medium at or in the core barrel. The outflows are designed and arranged according to the amount and the viscosity of the overburden, a compound of abraded material and blasting medium. For instance, an opening or several thereof may be installed in the end plate. Alternatively or additionally, openings may also be arranged in the core barrel.

Furthermore, the removal of the overburden, where necessary, may be aided by channel-like recesses in the outer surface of the core barrel. In these recesses, the removal of the overburden is aided outside the drill bit. Optionally, openings in the core barrel may end in these recesses and/or the recesses may run in a spiral pattern.

In a comparable way, the inlets to the high-pressure jet nozzles, through which the blasting medium is led to the high-pressure jet nozzles, may be realized as channels in the wall of the core barrel. Such an inlet construction, which is installed in a solid component, has the advantage, specifically with respect to a blasting medium under high pressure, that rigid or interference-prone inlets can be avoided. By rotary feedthroughs, a static inlet may be realized in a component/part that can be rotated. The same applies to a variation of the embodiment in which the inlets are directed through or into the end plate to high-pressure jet nozzles arranged at this point. With regard to such inlets formed in the walls of the components and the required rotary feedthroughs, reference is made to EP 3 305 426 A1, in which various embodiments are described.

The inlets of the blasting medium may additionally or alternatively be arranged outside the wall. The differences between the internal ring radius or the external ring radius and the internal core barrel radius or the external core barrel radius, respectively, permit the formation of a sufficient distance between the wall of the drilling core or the drilled hole and the internal or external wall of the core barrel, respectively. During the drilling, the inlets of the blasting medium to the jet nozzles may for instance be arranged on the wall of the core barrel.

In order to carry out the method of core drilling, the drill bit is rotated about the axis of the drill bit by a drive unit, usually the drive unit of the external supply unit, and a forward motion is carried out. As a result, an annular abrasion of material occurs, which corresponds to the ring of the abrasion elements at the front end of the drill bit. With an advancing forward and continuous rotary motion, a cylindrical drilling core is formed, which increasingly protrudes into the core barrel.

Simultaneously or from a desired length of the drilling core, jets of the blasting medium, which is under high pressure, may be generated by the high-pressure jet nozzles of the drill bit and may be directed into the interior of the drill bit and thus towards the drilling core. As a result, material is removed from the drilling core as soon as the abrasive jets hit the drilling core. The material detached from the drilling core mixes with the blasting medium and is transported from the drilling core into the existing channel by the outflows described above.

By selection of the type, number, position, and orientation of the high-pressure jet nozzles, the abrasion of material may be achieved to the desired extent and the desired shape.

Through the type of jet nozzles, the bundling of the jet and thus, the intensity and the extent, i.e., the depth and surface, of the abrasion generated by a jet, for instance, may be varied. Similar may be achieved through the number and position of the high-pressure jet nozzles. In this way, the abrasion may occur on a large surface or at chosen locations through an even effect of the jets of several distributed high-pressure jet nozzles.

For instance, one or more high-pressure jet nozzles may be arranged on the inner surface of the core barrel behind the abrasion elements. If their jets are directed onto the axis of the drilling core, given that the jet directions have an, or rather the same, angle $\beta$ in the range of $-45°$ to $+45°$ in relation to the normal of the inner surface at the nozzle outlet, a gap may be inserted all around into the drilling core, which can be directed to the drilling core center and thus lead to the separation of a section of the drilling core. For this purpose, the drilling process is completed, or at least the advancing drive of the drill bit is stopped, after reaching the desired length of the drilling core, and a cut is made into the drilling core by the jet nozzles and the blasting medium under high or maximum pressure. In regards to the alternative of the drill bit continuing to rotate without the advancing drive, a more uniform cutting result may be achieved in comparison to a stationary drill bit. In addition, fewer jet nozzles are required as a result of the rotation of the jet nozzles which remain stationary in the direction of the depth of the drilled hole.

For this variation of the method, likewise for the formation of a drilling core which protrudes far into the drill bit, it is of advantage to stabilize the drilling core during the abrasion of material and/or to fasten the drilling core after the separation of a section. For this purpose, the core barrel may have a holding mechanism that holds the drilling core. The holding mechanism can hold the drilling core from the end plate or the core barrel. For instance, springs or a press pad or several thereof may be arranged at the inner surface. The press pads expand in the direction of the drilling core as they are filled with a fluid, that is the blasting medium or another fluid, and press against the drilling core. The blasting medium being applied at the drill bit allows, for instance, a press pad or several thereof to be filled. Alternatively, another medium, for instance pressurized air, may be used for such a press pad. The holding force to be applied may be varied by means of contact pressure and contact surface. In another embodiment, grooves, which are arranged differently, may be inserted in the drilling core, in which the holding means can have access to, by a ring of high-pressure jet nozzles or an individual high-pressure jet nozzle.

Alternatively or additionally, the high-pressure jet nozzles may be directed to a large area towards the rear part of the drilling core, i.e., its free end, with such a rate of abrasion, so that the drilling core may be abraded continuously. The abrasion progress may correspond to the advancing drive of the drill bit according to the mechanical abrasion.

Further designs are possible. For instance, different combinations of how the jet nozzles are operated using rotation and/or forwards motion are possible. The abrasion of material, for instance, can also take place during a halt in rotation and thus, a halt in the mechanical abrasion.

In another embodiment of the method, the mechanical abrasion of material at the front end of the core barrel may be complemented by an abrasion using a blasting medium. For this purpose, at least one high-pressure jet nozzle may be arranged at the front face of the core barrel and may be aligned with the drilling direction. The orientation also may deviate from the drilling direction by a few degrees, resulting in a wider annular gap and narrower drilling core. The intensity and width of abrasion by the blasting medium also depend on the application in this instance.

The combination of the mechanical abrasion and the use of jet nozzles make it possible that the jet nozzles, together with the blasting medium, alternatively also a flushing medium with a reduced pressure of a maximum pressure of a few bar (e.g., 10 bar), may be used for cooling and/or flushing.

The described method may be used for earth drilling in geology, geothermal energy, construction, or other applications where both vertical and horizontal drilled holes are required. One application is, for instance, the opening up of complete or partial closures of closed channels (ducts) that formed as a result of adherences on their inner surface. Instead of using channel cutters to completely remove the material clogging the channel, only annular holes with an outer diameter equal to or slightly smaller than the inner diameter of the channel are drilled with the drill bit described and the remaining drilling core is removed. This reduces the effort for such a channel opening considerably.

The drill bit is operated for this purpose using a channel (duct) cleaning device, by which the advancing drive and the rotation of the drill bit is carried out and the blasting medium, which is under a high pressure, is added.

Such a device comprises the above described drill bit at its front end, a suitable mechanism for moving and positioning of the drill bit in the channel (duct), as well as a medium inlet for the supply of the blasting medium, which is under a high pressure, to the high-pressure jet nozzles. Various designs are suitable as moving mechanisms, for instance hand-operated or machine-operated feed rods or towing devices. Remote-controlled carriages or other designs also may be used. It is apparent that the moving mechanism as well as the drill bit, are designed in such a way that both can be positioned and moved at least along one side at a distance from the wall of the channel (duct).

Methods and devices subsequently shall be explained in more detail using examples, but shall not be limited to those.

The accompanying figures are only a schematic representation of the devices for a better understanding and do not lay claim to being complete or to scale.

Figure 2A:
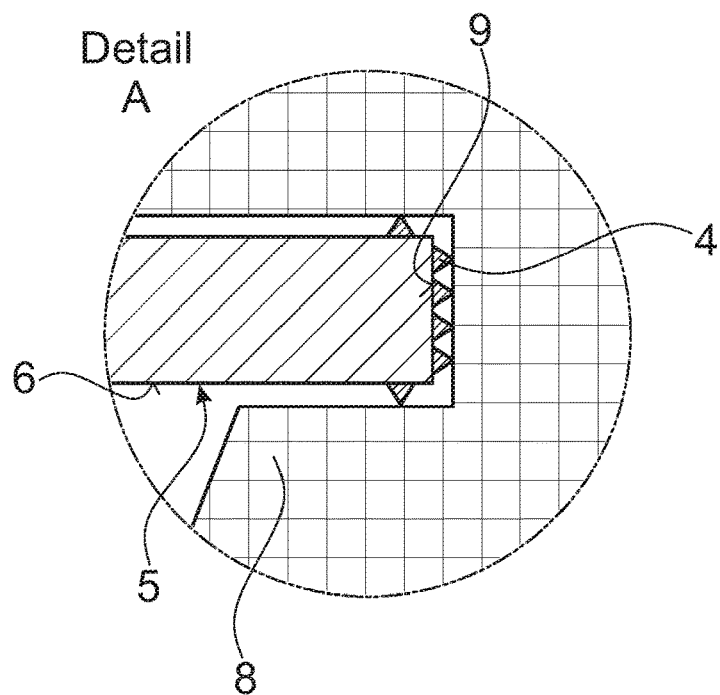
FIG. 2A is a detailed illustration of an example front end of a drill bit of FIG. 1.
Figure 2B:
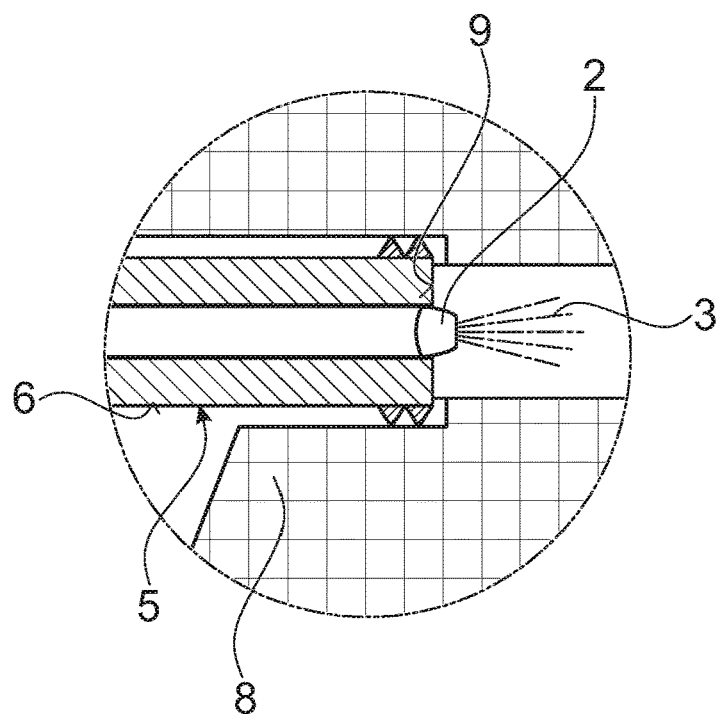
FIG. 2B is a detailed illustration of another example front end of a drill bit.

With reference to the figures, a drill bit 1 has a hollow cylindrical core barrel 5 with an axis. In one example, as illustrated in FIG. 2A, abrasion elements 4 are fixed on a front face 9 of the core barrel 5, so that there is a circular arrangement of abrasion elements 4 on the front face 9. In another example, as illustrated in FIG. 2B, one or more jet nozzles 2 is/are arranged on the front face 9. In some such examples, at least one of the jet nozzles 2 is oriented in a direction of drilling and/or is configured to generate high-pressure jets of a blasting medium 3 in the direction of drilling. At a rear end 17 of the core barrel 5, an end plate 13 is arranged, as illustrated in FIG. 1.

The end plate 13 has a central recess 15, which serves as a connector for the formation of a mechanical connection to a supply unit 20 of a drilling unit 40 (also referred to herein as device 40) arranged behind the drill bit 1, on its surface which faces away from the core barrel 5. The supply unit 20 serves to move the drill bit 1, supply blasting medium 3, supply power to the drive unit 21, and control the drive unit.

A shaft 12 ends in the recess 15 of the drill bit and is mounted to the end plate 13 with a flange 22. The shaft 12 transmits a rotary motion of drive unit 21 of supply unit 20 to the end plate 13 of the drill bit 1. The drive unit 21 can make use of a different driving mechanism, for instance electric, hydraulic, or others.

The end plate 13 further has two high-pressure jet nozzles 2, whose blasting directions (presented as dashed line) are directed towards an inner surface 6 of the core barrel 5 at a flat angle measured in relation to the surface of the end plate 13. The jet nozzles 2 are countersunk in the surface of the end plate 13 in order to ensure an unhindered jet spreading even at such a flat angle.

The jet nozzles 2 are connected to a high-pressure source 30 of blasting medium 3. Inlets 11 of the high-pressure source 30 to the jet nozzles 2 run in channels or lines through the supply unit 20, through its shaft 12, over a central distributor 19 in the end plate 13 to the high-pressure jet nozzles 2. Other realizations of the inlets 11 and of the connection to the high-pressure source 30 are possible.

Figure 3:
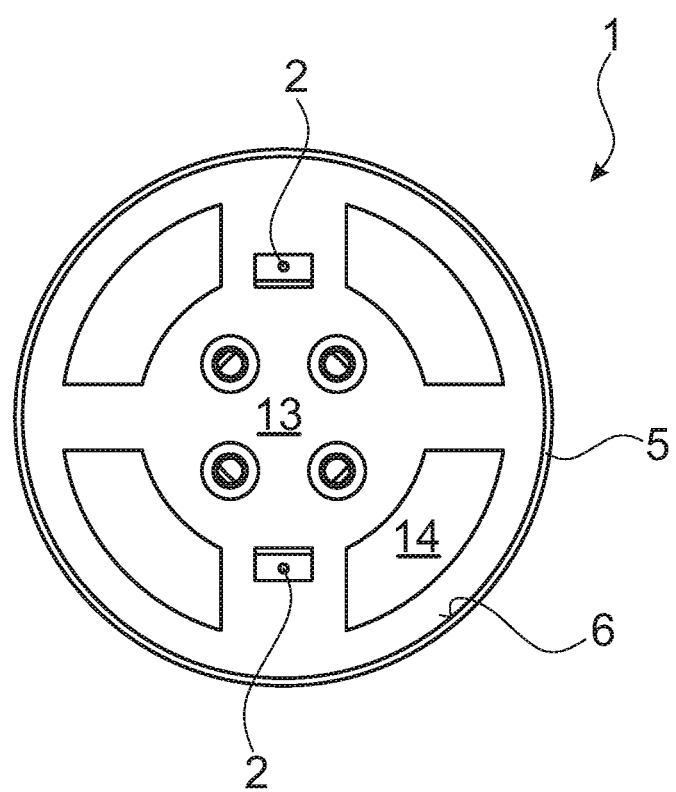
FIG. 3 is a front view of an example of a drill bit.

FIG. 3 presents a first view into the drill bit 1. Both jet nozzles 2 are arranged in the end plate 13 in a radial manner and opposite each other. The end plate has four evenly distributed circular segments, which form outflows 14 for overburden generated in the drill bit (not shown). The outflows 14 are realized as openings running through the end plate 13.

Device 40 according to FIG. 1, for instance, may be configured to remove adherences at the inner surface of channels 50, specifically closed channels (ducts). Thus, in the description herein, device 40 also may be referred to as channel cleaning device 40. In this case, the supply unit 20 may have a suitable moving mechanism 24, such as wheels, chains, runners, or others. If the drill bit 1, as shown in FIG. 1, is larger than the supply unit in regards to at least one dimension, suitable measures can be taken to center the drill bit 1 in the channel (duct). Suitable ways to keep the distance may be used or the moving mechanism may be arranged in such a way around the device that a centering, using the moving mechanism, may be carried out.

Figure 4A:
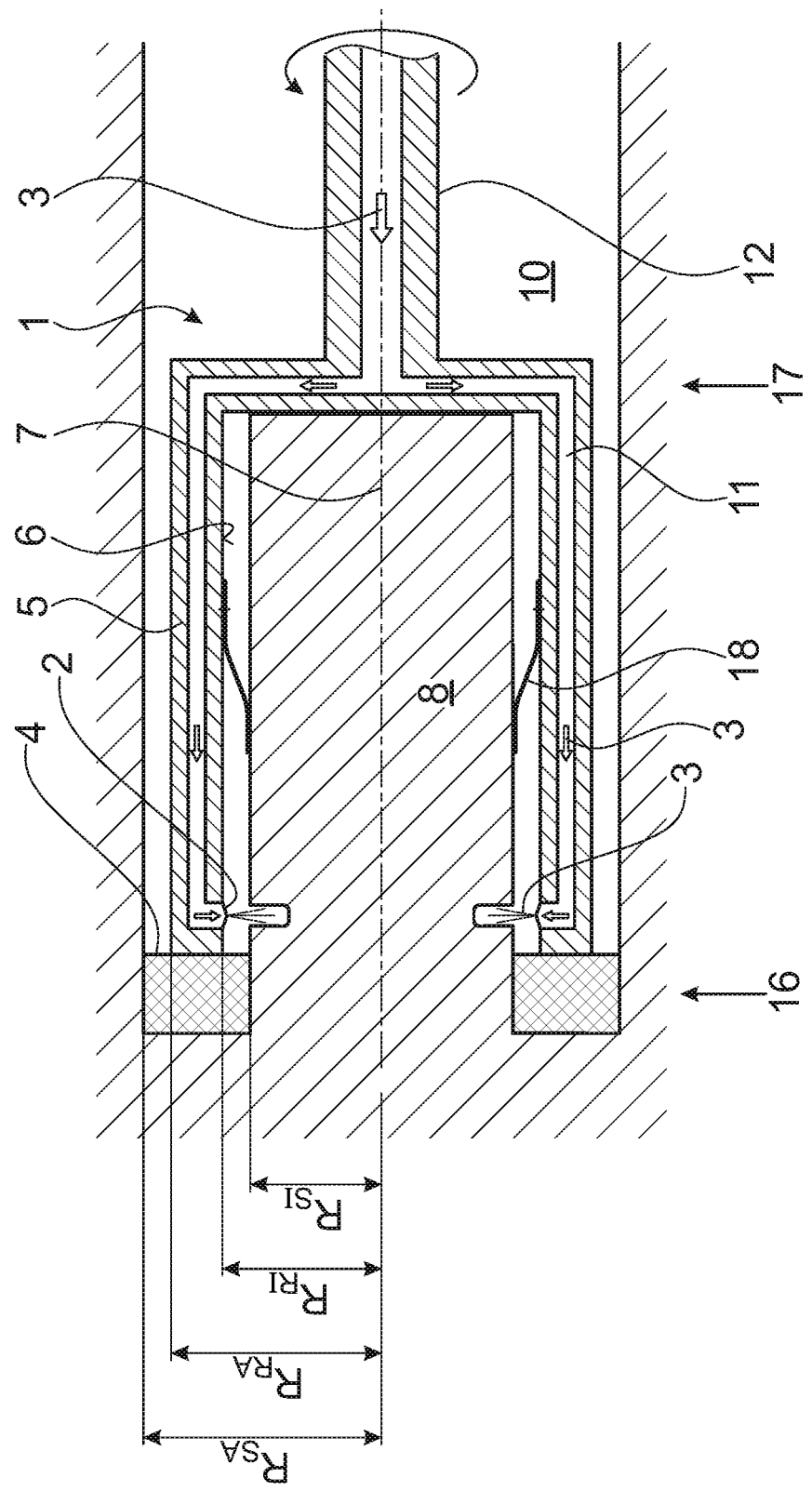
FIG. 4A is a cross-sectional view of another example of a drill bit.
Figure 4B:
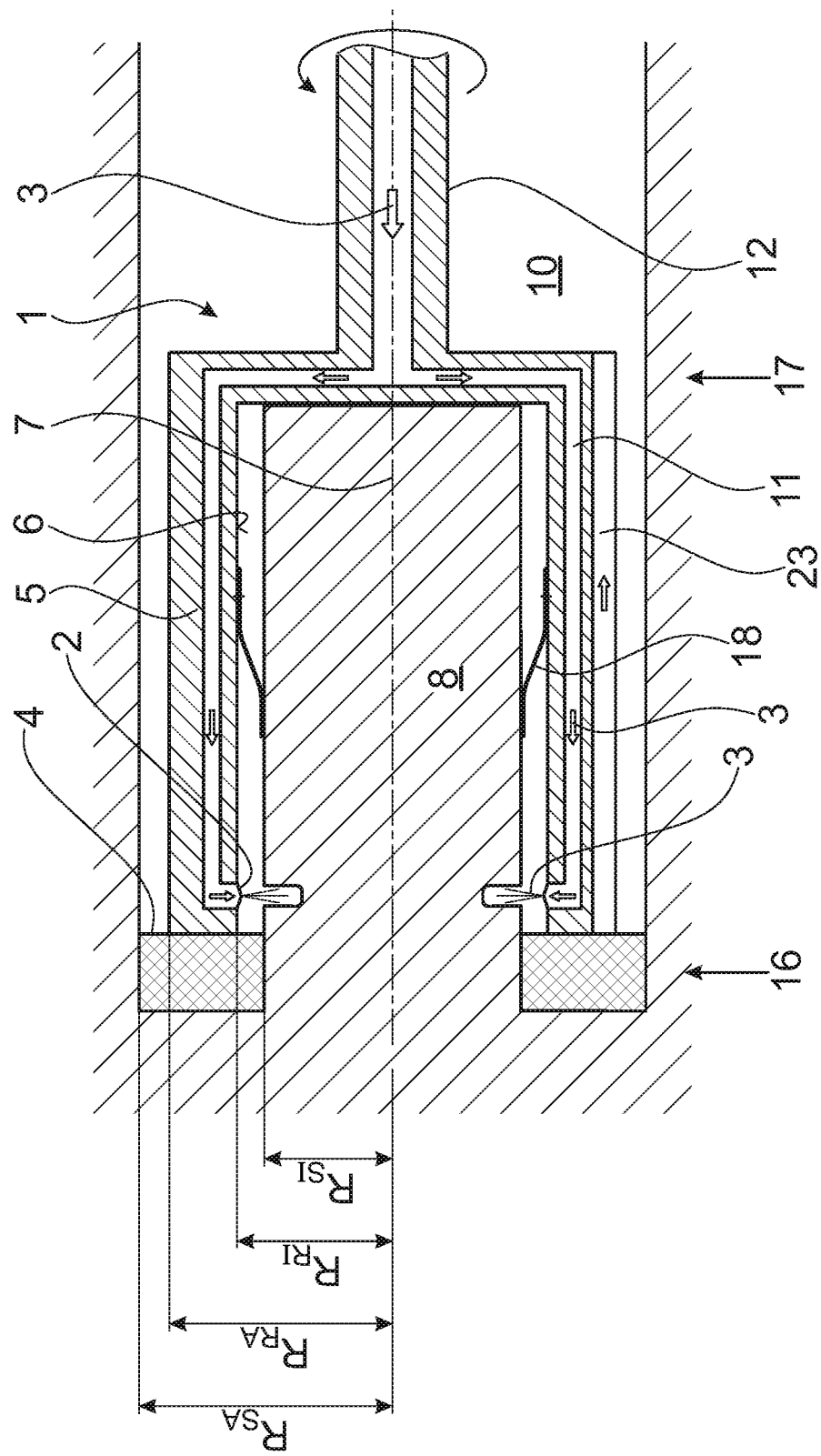
FIG. 4B is a cross-sectional view of another example of a drill bit.

FIGS. 4A and 4B present alternative embodiments of drill bit 1. In the examples illustrated in FIGS. 4A and 4B, the drill bit has several jet nozzles 2 for the blasting medium 3, which are arranged in a distributed manner on a circumference of the inner surface 6 of the core barrel 5 behind the abrasion elements 4 (schematically shown as a block) when seen from the front end of the drill bit. The arrangement of the jet nozzles 2 shall be referred to as nozzle ring in the following discussion. Their blasting direction runs into the hollow cylinder of the core barrel 5. The blasting direction of the jet nozzles may be perpendicular to the surface of the inner surface 6 in the direction of an axis 7 of the core barrel 5. Alternatively, it also may deviate from the direction at an angle of up to +/−45°, i.e., running more towards the front end 16 or the rear end 17. Larger deviations are possible as far as it is suitable for the application. The angle orientation of the blasting direction may be varied by the jet nozzles.

The jet nozzles 2 are arranged in such a way that none of the jet nozzles 2 extend beyond the internal radius of the abrasion elements 4, i.e., they are at a smaller distance to the axis 7 of the core barrel than the abrasion elements. Otherwise, the jet nozzles 2 would collide with a drilling core 8 during the drilling. From a construction point of view, this can be realized in different ways. The jet nozzles 2 may be countersunk in the inner surface 6 of the core barrel 5, so that they do not extend beyond the inner surface 6. Alternatively or additionally, the internal diameter of the ring of the abrasion elements 4 (internal ring diameter, corresponding to the internal ring radius $R_{KI}$) may be smaller than the internal diameter of the core barrel 5 (internal core barrel diameter, corresponding to the internal core barrel radius $R_{RS}$), so that the jet nozzles may extend beyond the inner surface 6 of the core barrel 5 to an extent, which is smaller than the difference between the internal tube radius and the internal ring radius $R_{SJ}$.

The high-pressure jets of a blasting medium 3 with an abrasive effect, which are distributed over the circumference and directed towards the axis 7 of the drill bit 1, allow to cut the drilling core 8 at a desired length, at a maximum of an internal free length of the drill bit 1.

The distance of the nozzle ring to the front end of 16 of the drill bit 1 thereby defines the maximum cutting length of the drill bit 1. In the shown embodiment, the nozzle ring is arranged at the front end of the core barrel 5 as close as possible behind the abrasion elements 4. A larger distance to the front end 16 or several nozzle rings are possible as an alternative.

On the core barrel 5 with the operating direction into the core barrel 5 and thus, into the drilling core 8, holding mechanism 18, for instance leaf springs, are arranged, which are suitable for holding and/or fixing the drilling core 8 with such a force that the drilling core 8 can be removed from drilled hole 10 using the drill bit 1. It is apparent that the force to be applied and, corresponding to this, the suitable holding mechanism 18 depend on the size, weight, and stability of the drilling core 8.

The drill bit 1 has a shaft 12 through which the drill bit may be mechanically connected to a suitable drilling unit (e.g., device 40). The inlet 11 of the blasting medium to the high-pressure jet nozzles 2 runs in channels through the shaft 12 and the wall of the core barrel 5. The drill bit 1 in addition has outflows (not shown) for the removal of the overburden as presented in the general description. In some examples, such as the example illustrated in FIG. 4B, the drill bit 1 includes channel-like recesses 23 in the outer surface of core barrel 5 that are configured to aid in the removal of the overburden.

For the purpose of clarifying the functional relationships between the components of the drill bit and the drilling unit, the method is explained using the example of working channel (duct) walls by the device according to FIG. 1. Through the above described device, work on closed channels (ducts) may be carried out using the following basic steps:

- moving the drilling unit in the channel (duct) 50 to an obstacle to be removed or to an adherence to be removed;
- activating the drive unit 21 and generating a rotation of the drill bit 1 while the drilling unit 40 continues to move forward in the channel (duct) 50, but at a considerably reduced speed;
- generating two directed, bundled high-pressure blasting (jets) by both jet nozzles 2 through a supply of the fluid blasting medium 3, which is under high pressure, to the jet nozzles 2;
- cutting a drilling core 8 by way of the abrasion elements 4 at the front end 16 of the drill bit 1;
- abrading the drilling core 8 in the drill bit 1 by the high-pressure blasting (jets) until the adherence is broken; and
- during the cutting and abrading, removing the overburden through the end plate 13 behind the drill bit and into an open area of the channel (duct) 50.

The controlling of the rotation of the drill bit and the drive unit of the drilling unit as well as the controlling of the blasting medium may occur using a suitable control unit (not shown). For the controlling of the abrasion and the controlling of the method, the surroundings of the device may be captured using a camera.

Corresponding to different alternative embodiments of the device, different variations of the method are possible.

Illustrative, non-exclusive examples of inventive subject matter according to the present disclosure are described in the following enumerated paragraphs:

A1. A method for the execution of core drillings into a material by way of drilling units, which use a drill bit, which has a core barrel, and which has abrasion elements distributed across a surface of the core barrel in a circular manner at a front end of the core barrel serving the abrasion of material, the method comprising:

executing a forward motion of the drill bit combined with a rotation of the drill bit about its axis by a drive unit for annular abrasion at the material and formation of a drilling core of the material in the core barrel;

providing a blasting medium under high pressure at the drill bit;

generating at least two high pressure jets of the blasting medium directed into an inside of the drill bit by means of high-pressure jet nozzles; and abrading the material at the drilling core by the blasting medium.

A2. The method according to paragraph A1, whereby the abrading of the drilling core takes place at its free end by the blasting medium.

A3. The method according to any of paragraphs A1-A2, whereby a section of the drilling core is cut off by the high-pressure jets of the blasting medium, which are directed towards the axis of the drill bit.

A4. The method according to any of paragraphs A1-A3, whereby at least one further high-pressure jet nozzle, which is arranged on a front face of the core barrel, is blasting in the direction of drilling.

A5. The method according to any of paragraphs A1-A4, whereby the method is used in conjunction with a channel cleaning device for the removal of adherences at the inner surface of closed channels by high-pressure blasting.

B1. A drill bit comprising:

a core barrel, with an axis A and a front end and a rear end, which is opposite to the front end; whereby the core barrel has abrasion elements, which are fixed at the front end on the surface of the core barrel distributed in a circular manner, and whereby, at the rear end of the core barrel, an end plate is arranged;

a connector for the formation of a mechanical connection between the drill bit and an external supply unit of a drilling unit in such a way that the drill bit can be rotated; and at least two high-pressure jet nozzles, which can be connected with an external high-pressure source of a blasting medium, whereby the high-pressure jet nozzles are arranged on an inner surface of the core barrel and/or on a surface of the end plate facing the front end and are directed to an inside of the core barrel.

B2. The drill bit according to paragraph B1, whereby the jet nozzles are oriented towards an inside of the drill bit in such a way that jets of the jet nozzles blast on the inner surface of the core barrel or the end plate.

B3. The drill bit according to any of paragraphs B1-B2, whereby the drill bit has at least one outflow for removal of overburden from the inside of the core barrel, and the at least one outflow is an opening formed into the end plate.

B4. The drill bit according to any of paragraphs B1-B3, whereby a direction of a/the jet of the high-pressure jet nozzles can be varied.

B5. The drill bit according to any of paragraphs B1-B4, whereby at least one high-pressure jet nozzle is arranged on the inner surface of the core barrel behind the abrasion elements, whereby a jet direction of the high-pressure jet nozzle is at an angle β relative to the normal of the inner surface at a nozzle outlet in the range of −45° to +45°.

B6. The drill bit according to any of paragraphs B1-B5, whereby an outside surface of the core barrel has channel-like recesses, which run to the rear end.

B7. The drill bit according to any of paragraphs B1-B6, whereby inlets to the high-pressure jet nozzles are formed in a wall of the core barrel and/or in the end plate.

B8. The drill bit according to any of paragraphs B1-B7, whereby the core barrel has a holding mechanism for holding a drilling core in the core barrel.

B9. The drill bit according to any of paragraphs B1-B8, whereby at least one high-pressure jet nozzle at a front face of the core barrel is oriented in a direction of drilling.

C1. A device for the removal of adherences at inner surfaces of channels by high-pressure blasting, the device comprising:

a drill bit according to any of paragraphs B1-B9, which is arranged at a front end of the device;

a moving mechanism for moving and positioning the drill bit in the channel; and a medium inlet for supply of the high-pressure jet nozzles with a blasting medium which is under high pressure;

whereby the moving mechanism and the drill bit both can be positioned and moved at least along one side at a distance to a wall of the channel.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method for the execution of core drillings into a material by way of drilling units which use a drill bit, which has a core barrel, which has an end plate arranged at a rear end of the core barrel, and which has abrasion elements distributed across a surface of the core barrel in a circular manner at a front end of the core barrel serving the abrasion of material, the method comprising:
   executing a forward motion of the drill bit combined with a rotation of the drill bit about a central axis of the drill bit via a drive unit for annular abrasion at the material and formation of a drilling core of the material in the core barrel;
   providing a blasting medium under high pressure to the drill bit;
   generating at least two high pressure jets of the blasting medium directed into an inside of the drill bit via high-pressure jet nozzles arranged on a surface of the end plate facing the front end and directed to an inside of the core barrel; and
   abrading the material at a free end of the drilling core by the blasting medium.

2. The method according to claim 1, wherein the abrading the material comprises abrading the material within the inside of the core barrel.

3. The method according to claim 1, whereby a section of the drilling core is cut off by the high-pressure jets of the blasting medium, which are directed towards the central axis of the drill bit.

4. The method according to claim 1, whereby at least one further high-pressure jet nozzle, which is arranged on a front face of the core barrel, blasts in the direction of the forward motion of the drill bit.

5. The method according to claim 1, whereby the method is used in conjunction with a channel cleaning device for the removal of adherences at the inner surface of closed channels by high-pressure blasting.

6. The method of claim 1, further comprising removing excavated matter resulting from the abrading of the material at the free end of the drilling core, via one or more outflows included in the end plate at the rear end of the drill bit.

7. The method of claim 1, wherein the providing the blasting medium under high pressure to the drill bit comprises providing the blasting medium to the drill bit at a pressure of at least 80 bar and at most 6000 bar.

8. A drill bit comprising:
   a core barrel, with a central axis and a front end and a rear end, which is opposite to the front end; whereby the core barrel has abrasion elements, which are fixed at the front end on the surface of the core barrel and distributed in a circular manner, and whereby, at the rear end of the core barrel, an end plate is arranged;
   a connector for the formation of a mechanical connection between the drill bit and an external supply unit of a drilling unit in such a way that the drill bit can be rotated;
   at least two high-pressure jet nozzles, which can be connected with an external high-pressure source of a blasting medium, whereby the high-pressure jet nozzles are arranged on an inner surface of the core barrel and/or on a surface of the end plate facing the front end, and are directed to an inside of the core barrel; and
   wherein the drill bit has at least one outflow for discharging excavated matter from the inside of the core barrel, and the at least one outflow is an opening formed in the end plate.

9. The drill bit according to claim 8, whereby the jet nozzles are oriented towards an inside of the drill bit in such a way that jets of the jet nozzles blast on the inner surface of the core barrel or the end plate.

10. The drill bit according to claim 8, whereby a direction of a jet of the high-pressure jet nozzles is variable.

11. The drill bit according to claim 8, whereby at least one of the at least two high-pressure jet nozzles is arranged on the inner surface of the core barrel behind the abrasion elements, whereby a jet direction of the at least one of the at least two high-pressure jet nozzles is at an angle relative to the normal of the inner surface of the core barrel at a nozzle outlet in the range of −45° to +45°.

12. The drill bit according to claim 8, whereby an outside surface of the core barrel has channel-like recesses, which run to the rear end.

13. The drill bit according to claim 8, whereby inlets to the high-pressure jet nozzles are formed in a wall of the core barrel and/or in the end plate.

14. The drill bit according to claim 8, whereby the core barrel has a holding mechanism for holding a drilling core in the core barrel.

15. The drill bit according to claim 8, whereby at least one of the at least two high-pressure jet nozzles is included at a front face of the core barrel and is oriented in a direction of drilling.

16. A device for the removal of adherences at inner surfaces of channels by high-pressure blasting, the device comprising:
   the drill bit according to claim 8, which is arranged at a front end of the device;
   a moving mechanism for moving and positioning the drill bit in the channel; and
   a medium inlet for supply of the high-pressure jet nozzles with a blasting medium which is under high pressure;
   whereby the moving mechanism and the drill bit both can be positioned and moved, at least along one side at a distance from a wall of the channel.

17. The device of claim 16, wherein the inlet is configured to supply the high-pressure jet nozzles with the blasting medium at a pressure of at least 80 bar and at most 6000 bar.

18. The device of claim 16, wherein the blasting medium comprises solid particles.

19. The drill bit of claim 8, wherein at least one of the jet nozzles is arranged on the inner surface of the core barrel at the front end of the core barrel, behind the abrasion elements, such that the at least one of the jet nozzles is oriented towards the central axis of the drill bit.

20. The drill bit of claim 8, wherein the jet nozzles directly blast a drilling core of material to be abraded.

* * * * *